June 9, 1925.

J. E. SHAFFER

BRAKE MECHANISM

Filed March 30, 1922

Witnesses:
W. F. Kilroy
Harry R. L. White

Inventor:
John E. Shaffer,
By Hill & Hill Attys.

June 9, 1925. 1,540,869
J. E. SHAFFER
BRAKE MECHANISM
Filed March 30, 1922 2 Sheets-Sheet 2
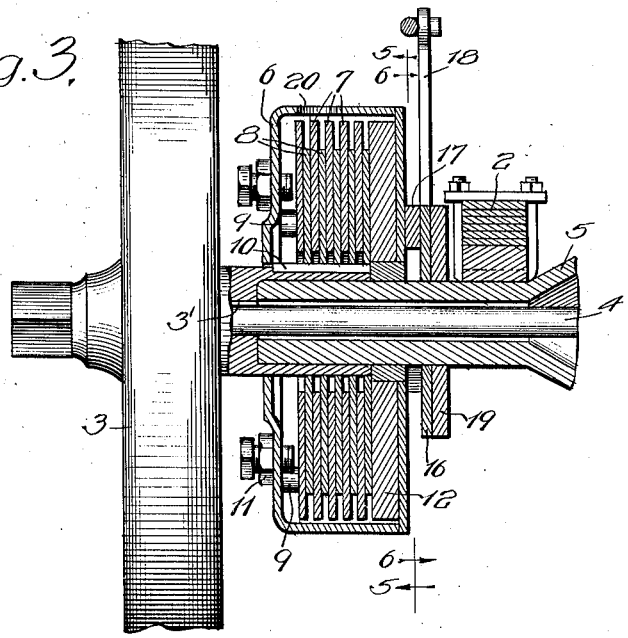
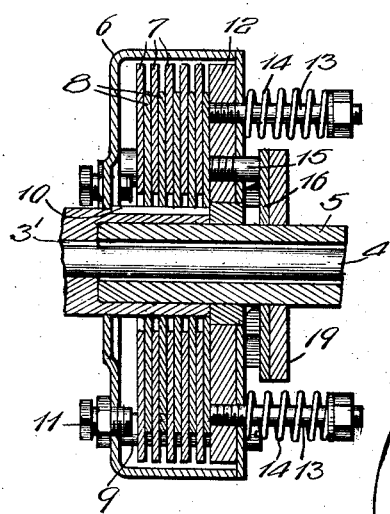
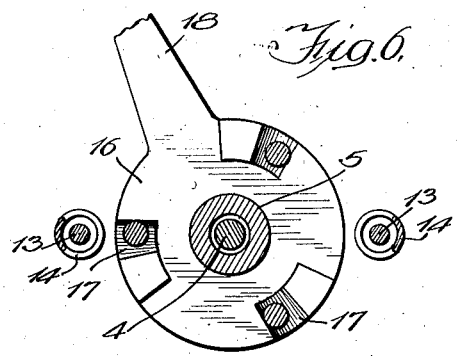
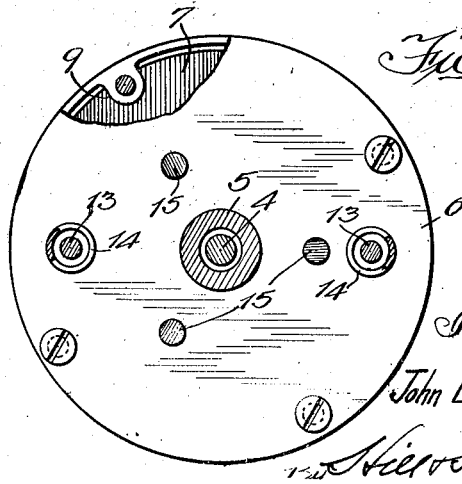
Witnesses:
W. F. Kilroy
Harry R. L. White
Inventor:
John E. Shaffer, Patented June 9, 1925.

1,540,869

UNITED STATES PATENT OFFICE.

JOHN E. SHAFFER, OF CHICAGO, ILLINOIS, ASSIGNOR, BY DIRECT AND MESNE ASSIGNMENTS, OF ONE-EIGHTH TO GEORGE V. STERLING, OF CHICAGO, ILLINOIS; THREE-EIGHTHS TO JAMES J. BURNS AND THREE-EIGHTHS TO JAMES C. SHRIVER, BOTH OF CUMBERLAND, MARYLAND.

BRAKE MECHANISM.

Application filed March 30, 1922. Serial No. 548,033.

*To all whom it may concern:*

Be it known that I, JOHN E. SHAFFER, a citizen of the United States, residing at Chicago, in the county of Cook and State of Illinois, have invented certain new and useful Improvements in Brake Mechanisms, of which the following is a description.

My invention relates to improvements in a brake mechanism particularly adapted to be used for motor vehicles or the like, and one of the objects of my invention is to provide a brake mechanism of the friction clutch type which may be arranged at the rear wheels of the vehicle or at the differential casing, or at any other desirable point in the driving mechanism and which will effectually accomplish the desired braking effect.

The invention has among its other objects the production of a device of the kind described which is simple, convenient, compact, durable, reliable, efficient and satisfactory for use wherever found applicable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a top plan view of my device, as applied to one of the rear wheels of a motor vehicle;

Fig. 3 is a vertical section through the device;

Fig. 4 is a vertical section similar to that shown in Fig. 3, but at right angles thereto;

Fig. 5 is a section taken substantially on the line 5—5 of Fig. 3; and

Fig. 6 is a section taken substantially on the line 6—6 of Fig. 3.

Figure 1:
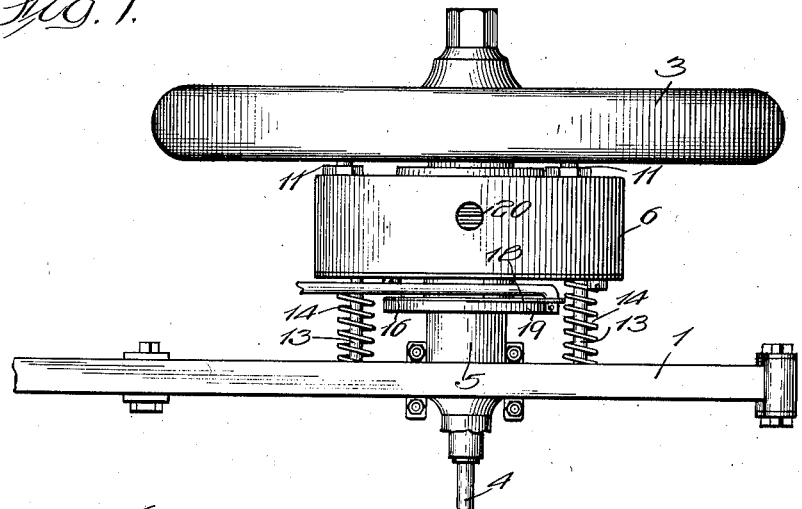
Figure 2:
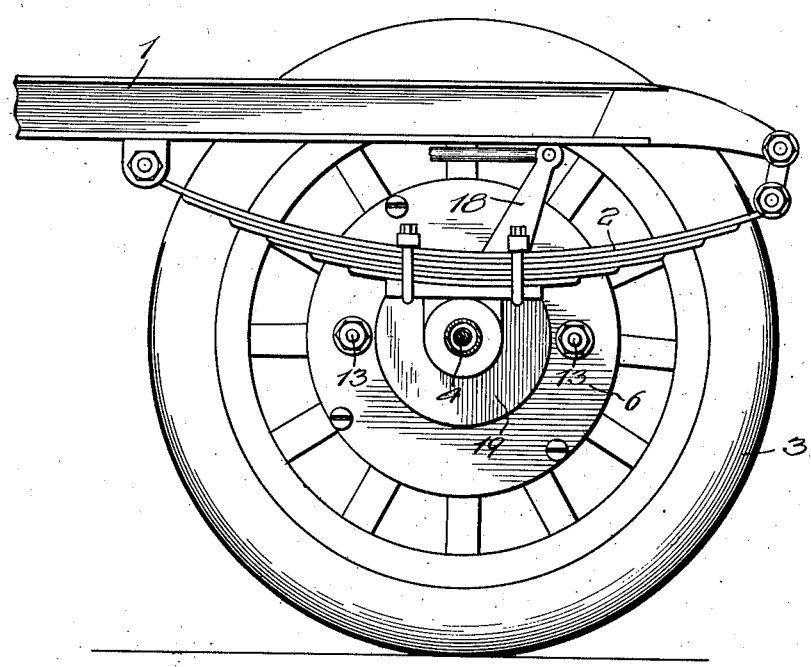
Fig. 2 is a side elevation of the same.

In the drawings, wherein I have illustrated the preferred embodiment of my invention, there is shown a portion of a motor vehicle having a frame 1, to which is attached a leaf spring 2 for resiliently supporting the frame from the rear wheel assembly. The rear wheels 3 (only one is shown) are driven by axles or shafts 4 or the equivalent which receive driving power through any desired or suitable mechanism, the axle drivingly connected to the hub of said wheel by a key 3' or other preferred means.

A tubular housing or casing 5 encircles the rotary axle or shaft 4 and extends between the wheel hub and the differential housing. In the device shown the hub of the wheel is extended into the brake housing 6, the wheel construction itself being as desired. Mounted upon the axle housing 5 is the brake housing or casing 6, said housing 6 being secured on the axle housing in any suitable manner. Arranged within the brake housing are series of plates or disks 7 and 8, any desired number being employed, and the same preferably being of alternately different metals, as for instance one set being of brass and the other of steel. One of the sets of disks, as for instance the set comprising the disks 7, is non-rotatably secured to the housing 6, as for instance by providing recesses at the peripheries of said disks 7 to be engaged by inwardly-extending lugs 9 provided at suitably spaced points on the inner periphery of the annular flange of the housing. The other set of disks 8 are keyed to the hub of the wheel, as for instance by a key 10, shown in Figs. 3 and 4, so that the disks 8 are rotatably driven with the shaft 4, and are slidable on the key 10, while the disks 7 are slidable along the lugs 9. Suitable stops for adjusting the sliding limits of the disks may be provided, as for instance, bolts 11 secured to the housing 6 and extending inwardly thereof to engage the disks.

At one side of the series of disks and contained within the housing is a plate 12, having pins or studs 13 extending through apertures in the housing. The studs 13 preferably lie in a horizontal plane, as shown, and have coiled springs 14 secured thereon between the outer ends and the housing. Also carried by the plate 12 and slidably projecting through apertures in the housing 6 are lugs or pins 15, the ends of said lugs preferably being beveled, as shown. A cam member 16, having a number of spaced cam faces 17 thereon, one for each of the lugs 15, is rotatably carried by and rockable on the housing 5, and has an extending lever arm 18 carried thereby, whereby the cam member may be rocked, as desired. A collar 19 is fixedly secured on the housing 5 to limit the movement of the cam axially in one direction.

If desired, the casing 6 may be partially filled with oil through the inlet 20 therein provided, so that the friction plates may run in oil.

The operation of the device is as follows:—

The members are normally in the position shown in Figs. 3 and 4, and when the cam 16 is rocked, the cam faces 17 will engage the pins or lugs 15 to press the plate 12 inwardly of the housing. This brings the several plates 8 and 9 into frictional contact to the desired extent, and, if desired, to such an extent that the wheels are positively locked against rotation.

When the operating lever is released, the plate 12 is returned to its normally-inoperative position by means of the springs 14, and the friction plates will come out of contact with one another as will be understood. As before mentioned, the device may be installed at various points of the motor vehicle,—in fact, at any point where a rotating or driving part is desired to be controlled.

The device is preferably installed at each of the rear wheels. In order to install the device to present-day structures, it is necessary only to remove the present braking apparatus and to substitute the device shown therefor. Obviously the emergency brake lever and the surface pedal may be connected to the braking mechanism illustrated, but generally it is preferred to have a separate braking mechanism for each. It will be particularly noted that with this style of braking mechanism it is never necessary to reline the brakes.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the kind described and in combination, a drive shaft, a vehicle brake comprising a slidably non-rotative friction plate, a friction plate drivingly carried by said shaft adjacent said first plate and slidable axially thereof, a member slidable to operably move said slidable plates and having a part projecting from the face opposite the sliding plate, a cam engageable with said last mentioned part, means for automatically returning said last mentioned member to its normal position after releasing said cam, and control means for operating said cam member.

2. In a device of the kind described and in combination, a vehicle brake comprising a casing carried by a stationary part, friction disks slidable in said casing, some of said disks being non-rotatable, a shaft rotatably carrying the others of said disks, a plate slidable and non-rotatable in said casing and having lugs extending therethrough, said plate operably engageable with said slidable disks, a cam rotatably encircling said shaft and engageable with said lugs to move said plate, a lever arm carried by said cam, and control means engageable with said lever arm.

3. In a device of the kind described and in combination a vehicle brake comprising a chambered casing carried by a stationary part and provided with an inlet for oil, friction disks slidable in said casing, some of said disks being non-rotatable, a shaft rotatably carrying the others of said disks, a non-rotatable plate in said casing and slidable to move said disks, said plate having lugs extending therethrough, a cam rotatably encircling said shaft and engageable with said lugs to move said plate, means for preventing axial movement of said cam, a lever arm carried by said cam, and control means engageable with said lever arm.

4. In a device of the kind described and in combination, a vehicle brake comprising a casing carried by a stationary part, friction disks slidable in said casing, some of said disks being non-rotatable, a shaft rotatably carrying the others of said disks, a plate slidable and non-rotatable in said casing and having lugs extending therethrough, said plate frictionally engageable with said disks, a cam rotatably encircling said shaft and engageable with said lugs to move said plate, springs on some of said lugs between their free ends and said casing to cause said plate to return to its normal position after the release of said cam from the other lugs.

5. The combination with a frame of a vehicle, a rotatable shaft, a tubular housing for said shaft, of a casing carried by said housing, friction disks slidable in said casing, some of said disks being non-rotatably secured to said casing, the others driven by said shaft, a plate within said casing movable to slide said disks and having lugs and pins extending axially through said casing, said pins lying in a horizontal plane, a cam member rotatably encircling said housing and operably engageable with said lugs, a lever arm carried by said cam member, a collar fixed on said housing to limit the axial movement of said cam in one direction, and springs between the ends of said pins and casing to return said plate to its normal position after the release of said cam member therefrom.

In testimony whereof, I have hereunto signed my name in the presence of two subscribing witnesses.

JOHN E. SHAFFER.

Witnesses:
 Roy W. Hill,
 Ruth M. Ephraim.